United States Patent
Shimooka et al.

(10) Patent No.: US 6,957,364 B2
(45) Date of Patent: Oct. 18, 2005

(54) COMPUTING SYSTEM IN WHICH A PLURALITY OF PROGRAMS CAN RUN ON THE HARDWARE OF ONE COMPUTER

(75) Inventors: Kenichi Shimooka, Yokohama (JP); Hiroshi Furukawa, Sagamihara (JP); Toshiaki Arai, Machida (JP); Hiroyuki Igata, Ebina (JP)

(73) Assignee: Hitachi, Ltd., Tokyo (JP)

( * ) Notice: Subject to any disclaimer, the term of this patent is extended or adjusted under 35 U.S.C. 154(b) by 566 days.

(21) Appl. No.: 09/917,830

(22) Filed: Jul. 31, 2001

(65) Prior Publication Data

US 2002/0108074 A1 Aug. 8, 2002

(30) Foreign Application Priority Data

Feb. 2, 2001 (JP) ........................ 2001-026825

(51) Int. Cl.[7] .............................................. G06F 11/00
(52) U.S. Cl. ...................................................... 714/25
(58) Field of Search ............................................ 714/25

(56) References Cited

U.S. PATENT DOCUMENTS

| | | | | |
|---|---|---|---|---|
| 5,805,790 | A | * | 9/1998 | Nota et al. .................. 714/10 |
| 6,691,146 | B1 | * | 2/2004 | Armstrong et al. ......... 718/100 |
| 2002/0013802 | A1 | * | 1/2002 | Mori et al. .................... 709/1 |
| 2002/0052914 | A1 | * | 5/2002 | Zalewski et al. ........... 709/203 |
| 2002/0087611 | A1 | * | 7/2002 | Tanaka et al. ................ 709/1 |
| 2002/0124201 | A1 | * | 9/2002 | Edwards et al. ............... 714/5 |
| 2002/0124213 | A1 | * | 9/2002 | Ahrens et al. ............... 714/57 |
| 2002/0184576 | A1 | * | 12/2002 | Arndt et al. .................. 714/48 |
| 2002/0194437 | A1 | * | 12/2002 | Kapoor et al. ............. 711/153 |

FOREIGN PATENT DOCUMENTS

| | | |
|---|---|---|
| JP | 8-227406 | 9/1996 |
| JP | 9-50386 | 2/1997 |
| JP | 9-171475 | 6/1997 |

* cited by examiner

*Primary Examiner*—Robert Beausoliel
*Assistant Examiner*—Michael Maskulinski
(74) *Attorney, Agent, or Firm*—Mattingly, Stanger, Malur & Brundidge, P.C.

(57) ABSTRACT

The present invention realizes configuration management, failure monitoring and control of hardware resources in an open architecture computer on which a plurality of OSs run. A management agent 2111 run on a partition 211 performs communication with a management console 10, management of data on hardware and software failure occurred in the partition 211, and communication with a partitioning control unit 221. The partitioning control unit 221 utilizes partition configuration information 2211 to manage and control hardware allocated to each partition 211, and to intermediate communication between the hardware 231 and the management agents 2111. A hardware data collection unit 23111 manages configuration information of all the hardware in the computer, and monitors status of and failures in the hardware.

10 Claims, 8 Drawing Sheets

|  | PROCESSOR | | | MEMORY | | | | |
|---|---|---|---|---|---|---|---|---|
|  | NUMBER | MODE | SHARING RATIO | SLOT NUMBER | TOTAL SIZE | DEDICATED SIZE | SHARED SIZE | JOINT PARTITION |
| PARTITION A | 1 | SHARED | 80% | 1,2 | 256MB | 128MB | 128MB | D |
| PARTITION B | 1 | SHARED | 20% | 3 | 128MB | 0MB | 128MB | D |
| PARTITION C | 2 | DEDI-CATED | - | 4 | 128MB | 128MB | 0MB |  |
| PARTITION D | 3,4 | SHARED | - | 2,3,5 | 384MB | 128MB | 256MB | A,B |
| ⋮ | ⋮ | ⋮ | ⋮ | ⋮ | ⋮ | ⋮ | ⋮ | ⋮ |
| PARTITION N |  |  |  |  |  |  |  |  |
| COMPUTER IDENTIFICATION INFORMATION (CHASSIS IDENTIFICATION NUMBER) : 000001 | | | | | | | | |

Column labels: 221101, 221102, 221103, 221104, 221105, 221106, 221107, 221108, 221109; bottom row: 221110

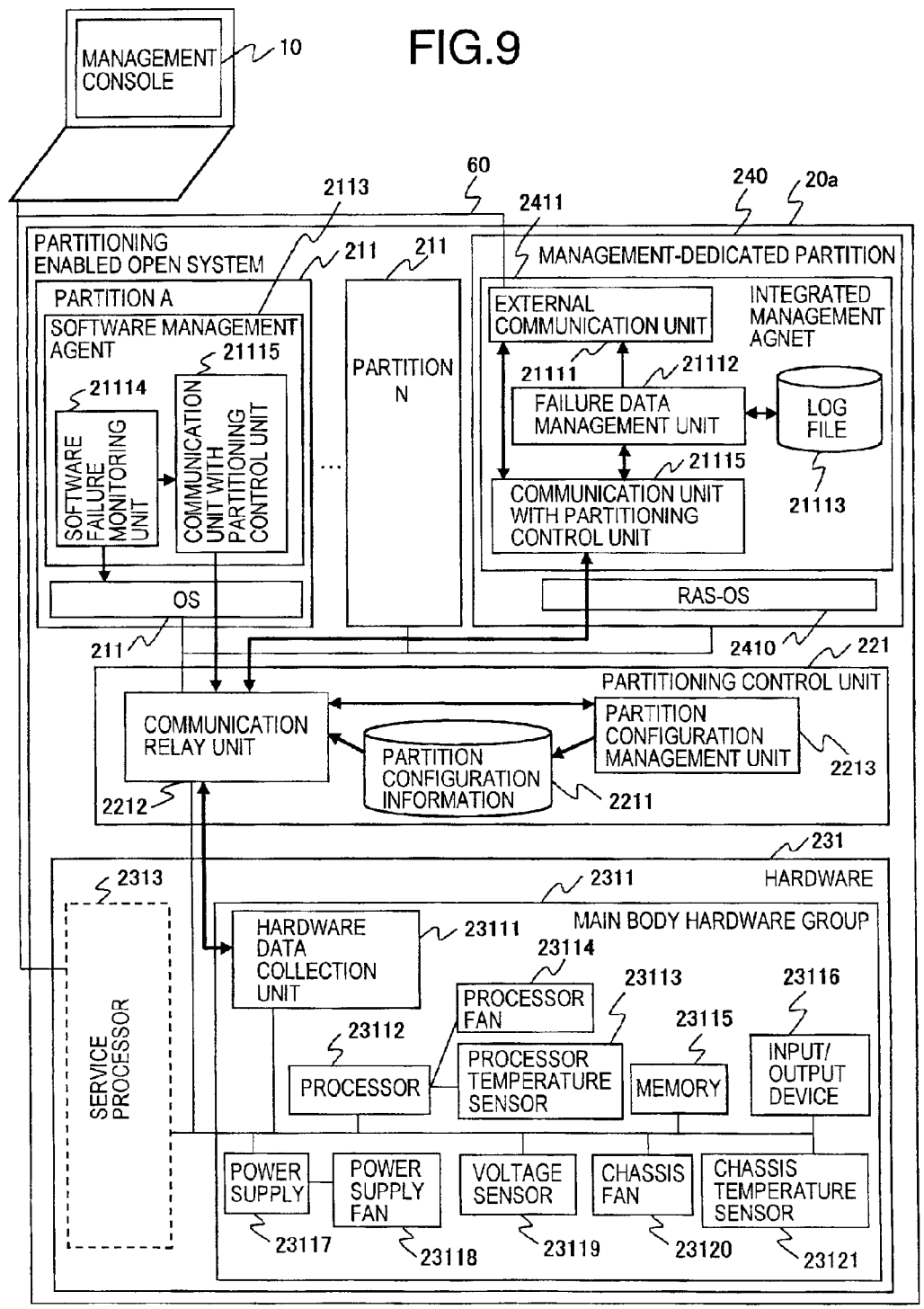

COMPUTING SYSTEM IN WHICH A PLURALITY OF PROGRAMS CAN RUN ON THE HARDWARE OF ONE COMPUTER

BACKGROUND OF THE INVENTION

The present invention relates to a computing system such as a virtual machine, a logical partitioned computer, a physical partitioned computer, or the like, and, in particular, to configuration management, failure monitoring and control of internal hardware resources in such a computing system.

Conventionally, vital service such as mission-critical service utilizes a mainframe computer. Generally, a mainframe computer comprises particular hardware architecture and a particular operating system oriented to that particular architecture. Configuration management, failure monitoring and control of hardware resources in such a mainframe computer are realized through a special monitoring apparatus or terminal provided separately from the main body of the computer. Usually, an administrator uses a management console, in order to manage, monitor and control internal hardware resource information collected by the special monitoring apparatus etc., to which the management console connects via network.

The reason why thus-described configuration is employed for management, monitoring and control of hardware resources in a mainframe computer is as follows. Namely, a mainframe computer is used for vital service such as mission-critical service, and that computing system is vital, and accordingly it is necessary to prepare a special monitoring apparatus or the like separately from the main body of the computer. Further, it is easy to prepare a special monitoring apparatus, since the number of computers under administration is small.

In the field of mainframe computers, a computing system has been conventionally known, such as a virtual machine, a logical partitioned computer, physical partitioned computer, or the like, in which a plurality of operating systems run in parallel on one computer. Also in such a computing system, configuration management and the like of hardware resources are realized similarly to a computing system on which a single operating system runs. Conventional examples of virtual machine are described in Japanese Unexamined Patent Laid-Open Nos. 9-171475 and 8-227406, etc., for example.

On the other hand, an open architecture computer such as a personal computer, workstation, or the like, comprising open hardware architecture and a multi-purpose operating system oriented to that architecture, has been rarely used for mission-critical service, owing to performance of the computer itself. Further, it is very rare to employ a computing system's configuration on which a plurality of operating systems run. Further, generally, the number of computers in which a system configured with open architecture computers is much greater than that with mainframe computers, and accordingly, it is not easy to provide a special monitoring apparatus or the like for each computer.

Accordingly, in an open architecture computer, usually, a management agent executed on an operating system performs configuration management, failure monitoring and control of hardware resources in a computer, and an administrator uses a management console connected to the computer via network to manage, monitor and control information on the hardware resources in the computer. Further, to cope with a fatal hardware failure, a certain server-type computer is sometimes provided with an apparatus for managing, monitoring and controlling hardware resources in the main body. In many cases, such an apparatus is implemented as a relatively simple add-in board or the like that can be housed in the main body. Such a conventional example is mentioned in Japanese Unexamined Patent Laid-Open No. 9-50386, for example.

SUMMARY OF THE INVENTION

Recently, however, performance of open architecture computer is getting close to that of mainframe computer, and, using open architecture computers to a central system for mission-critical service is increasing. Further, concerning management of computers, it is desired to integratedly manage computers without discriminating between mainframe computers and open architecture computers. Further, for accommodation to mission-critical service, it is desired, also in the case of using open architecture computers, to realize a computing system in which a plurality of operating systems run.

As described above, the conventional management system for mainframe computers presupposes that a special monitoring apparatus exists for management, monitoring and control of hardware resources. On the other hand, in many cases, an open architecture computer system does not have a special monitoring apparatus or the like, since the system includes many computers. Even if a special monitoring apparatus exists, its management function is simplified in many cases. Namely, a management configuration for open architecture computers similar to that for mainframe computers has not been realized. Further, a management configuration for hardware recourses in an open architecture computing system in which a plurality of operating systems run has not been even investigated.

An object of the present invention is to provide a hardware resource management system for an open architecture computer system that employs a computing system configuration in which a plurality of operating system run.

The present invention provides a computing system in which a plurality of OSs run on hardware of one computer, said computing system comprising: management agents that are respectively executed on the OSs, to manage said OSs; a partitioning control unit that keeps partition configuration information indicating a relation between each OS and the hardware, and controls allocation of the hardware to each OS; and a hardware data collection unit that collects information on said hardware; wherein: said computing system uses said partition configuration information to perform hardware management for each OS.

In that case, it is possible to further provide a management console for performing information collection, failure reception and control of said computer on which said plurality of OSs run.

Further, it is possible to provide arrangement wherein: when one of said management agents receives a request of said management console for acquisition of hardware configuration information, the management agent notifies said request to said partitioning control unit; the partitioning control unit, which has been notified of said request, acquires the information on said hardware from said hardware data collection unit, and extracts requested information on hardware using said partition configuration information, to send said information extracted to said management agent; and said management agent notifies the information received from said partitioning control unit to said management console.

Further, it is possible to provide arrangement wherein: when said hardware data collection unit detects an occurrence of a failure in a piece of the hardware, the hardware data collection unit notifies failure data to said partitioning control unit; said partitioning control unit notifies said failure data to a management agent corresponding to an OS allocated with said piece of the hardware in which the failure has occurred; and said management agent notified of said failure data, in turn, notifies said failure data to said management console. Or, said management agent may control software, based on the failure data notified.

Further, it is possible to provide arrangement wherein: when one of said management agents detects an occurrence of a failure in software, said management agent notifies failure data to said partitioning control unit; said partitioning control unit performs control of reallocation of the hardware allocated to each OS, or performs activation control for each OS, based on said failure data.

The present invention provides another computing system comprising: an integrated management agent that is executed on a first OS to manage a computer; software management agents that are respectively executed on the OSs except for said first OS, to each manage software executed on an OS concerned; a partitioning control unit that keeps partition configuration information indicating a relation between each OS and the hardware, and controls allocation of the hardware to each OS; and a hardware data collection unit that collects information on said hardware; wherein: said computing system uses said partition configuration information to perform hardware management for each OS.

In that case, it is possible to further provide a management console for performing information collection, failure reception and control of said computer on which said plurality of OSs run.

Further, it is possible to provide arrangement wherein: when said integrated management agent receives a request of said management console for acquisition of hardware configuration information, said integrated management agent notifies said request to said partitioning control unit; the partitioning control unit, which has been notified of said request, acquires the information on said hardware from said hardware data collection unit, and extracts requested information on hardware using said partition configuration information, to send said information extracted to said integrated management agent; and said integrated management agent notifies the information received from said partitioning control unit to said management console.

Further, it is possible to provide arrangement wherein: when said hardware data collection unit detects an occurrence of a failure in the hardware, the hardware data collection unit notifies failure data to said partitioning control unit; said partitioning control unit notifies said failure data to said integrated management agent; and said integrated management agent notifies the received failure data to said management console, or, the integrated management agent may control software through said software management agents, based on the failure data notified.

Further, it is possible to provide arrangement wherein: when one of said software management agents detects an occurrence of a failure in software, said software management agent notifies failure data to said partitioning control unit; said partitioning control unit performs control of reallocation of the hardware allocated to each OS, or performs activation control for each OS, based on said failure data.

Further, in the above-described computing system, it is possible to provide arrangement wherein: said partitioning control unit performs control of reallocation of the hardware allocated to each OS, or performs activation control for each OS, based on said failure data, according to an instruction of said management console.

BRIEF DESCRIPTION OF THE DRAWINGS

FIG. 3 is a diagram showing an example of structure of partition configuration information 2211;

FIG. 9 is a diagram showing another management configuration of an partitioning enabled open system.

DETAILED DESCRIPTION

Figure 1:
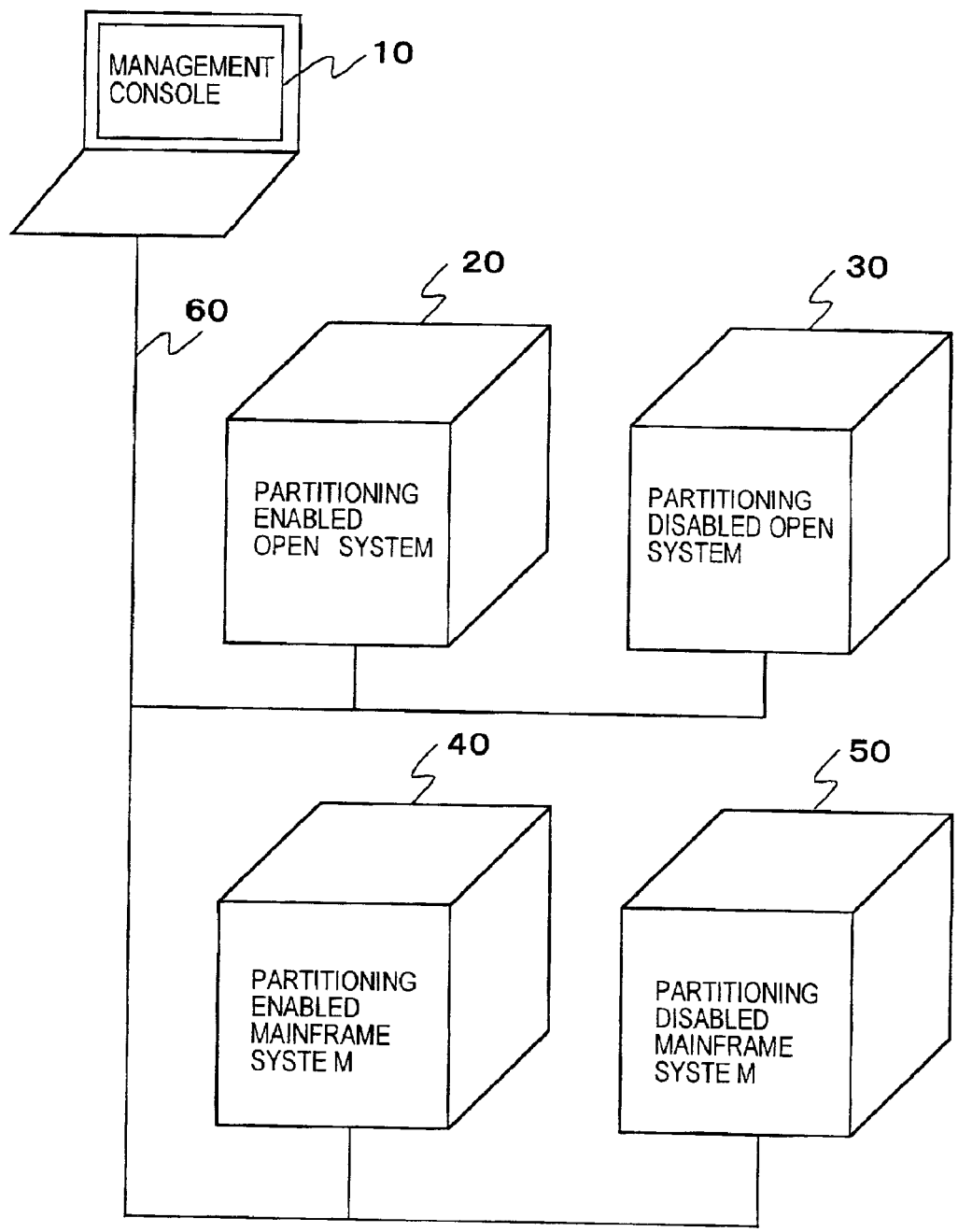
FIG. 1 is a diagram showing an example of configuration of a computing system to which the present invention is applied.

Now, embodiments of the present invention will be described in detail referring to the drawings. In the following description and in the legends in the drawings, for the sake of convenience of description, a computing system in which a plurality of operating systems (hereinafter, referred to as OS) run is called as a partitioning enabled system, and a computing system in which a single OS runs is called as a partitioning disabled system.

[First Embodiment]

FIG. 1 is a diagram showing an example of configuration of a computing system to which the present invention is applied.

As shown in the figure, this computing system comprises a management console 10, an partitioning enabled open system 20, an partitioning disabled open system 30, a partitioning enabled mainframe system 40, and a partitioning disabled mainframe system 50.

The management console 10 is a managing computer in the present computing system, and, on the other hand, the partitioning enabled open system 20, the partitioning disabled open system 30, the partitioning enabled mainframe system 40 and the partitioning disabled mainframe system 50 are managed computers as objects of the management by the management console 10.

The management console 10 is connected to a plurality of managed computers 20–50, through a network 60. The network 60 is realized by a local area network (LAN), a wide area network (WAN), dedicated lines, telephone lines, a wireless network, a wired network, or the like, for example.

In the figure, for the simplicity of illustration, one computer is shown for each system 20–50. However, a plurality of computers may exist as computers of each kind of system.

The management console 10, which provides a user interface for an administrator to perform configuration management, failure monitoring and control of the hardware of each managed computer, receives a request of the administrator and performs that request.

The partitioning enabled open system 20 is a partitioning enabled system realized by an open architecture computer, and the partitioning enabled mainframe system 40 is a partitioning enabled system realized by a mainframe computer.

Each of the partitioning enabled systems 20 and 40 comprises one computer provided with an environment that enables a plurality of OSs to run, and, in each partitioning enabled system, a plurality of OSs run. As examples of the partitioning enabled system, may be mentioned a virtual machine, a logical partitioned computer, and a physical partitioned computer.

The partitioning disabled open system 30 is a partitioning disabled system realized by an open architecture computer, and the partitioning disabled mainframe system 50 is a partitioning disabled system realized by a mainframe computer.

Each of the partitioning disabled systems 30 and 50 comprises one computer provided with an environment that enables one OS to run, and, in each partitioning disabled system, one OS runs.

In the present embodiment, the management console 10 can control all kinds of computing systems 20–50 connected through the network 60. Namely, each system 20–50 provides a management interface that is similar from the viewpoint of the management console 10, and accordingly, the management console 10 can manage those computing system integratedly.

In the following, a hardware resource management system in the partitioning enabled open system 20 will be described in detail.

Figure 2:
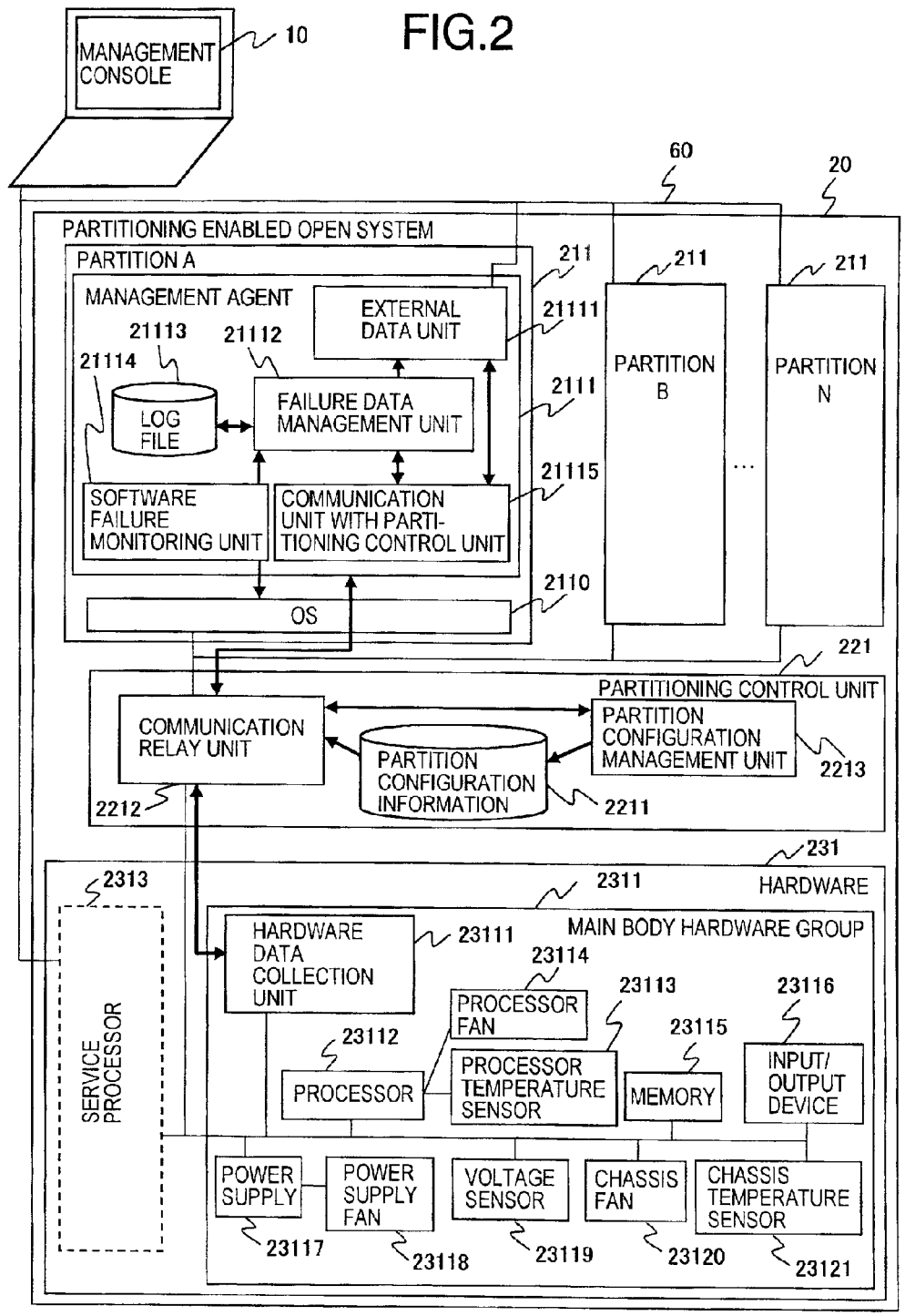
FIG. 2 is a diagram showing a management configuration of an partitioning enabled open system.

FIG. 2 is a diagram showing a configuration of the partitioning enabled open system 20. This figure shows a configuration required for performing configuration management, failure monitoring and control of the hardware resources. As shown in the figure, the partitioning enabled open system 20 comprises a plurality of partitions 211 (A–N), a partitioning control unit 221, and hardware 231.

Each of the partitions 211 is a unit in which one OS runs, and comprises one OS 2110, and a management agent 2111 that operates on the OS 2110.

The management agent 2111 communicates with the management console 10 through the network 60, and performs configuration management, failure monitoring and control of the partitioning enabled open system 20. The management agent 2111 is realized, for example, as software (a program) that operates on the OS 2110.

As shown in the figure, the management agent 2111 comprises an external communication unit 21111, a failure data management unit 21112, a log file 21113, a software failure monitoring unit 21114, and a communication unit with partitioning control unit 21115.

The external communication unit 21111 provides a communication interface (I/F) with the management console 10. The log file 21113 records failure data of each partition. The failure data management unit 21112 manages the log file 21113, and, for example, notifies the management console 10 or the partitioning control unit 221 of failure data. The software failure monitoring unit 21114 detects a software failure generated in each partition. The communication unit with partitioning control unit 21115 provides a communication I/F with the partitioning control unit 221.

Further, the partitioning control unit 221 controls allocation of the hardware of one computer to respective OSs of the partitions 211, in the partitioning enabled system. The partitioning control unit 221 is realized, for example, as firmware (a program).

As shown in the figure, the partitioning control unit 221 comprises partition configuration information 2211, a communication relay unit 2212, and a partition configuration management unit 2213.

The partitioning configuration information 2211 is information that indicates correspondence between each partition 211 and the hardware 231, and includes physical configuration allocation, allocation related to resources such as interrupt addresses and memory, and the like. Details of the partition configuration information 2211 will be described below.

The communication relay unit 2212 utilizes the partition configuration information 2211 and relays communication between each partition 211 and the hardware 231. Further, the communication relay unit 2212 relays an instruction from, for example, the management agent 2111 to the partition configuration management unit 2213, in order to perform dynamic change control of the hardware allocated to each partition 211, and to perform activation control such as activation, shutdown, forced shutdown, etc. of the OS 2110 on each partition 211.

The partition configuration management unit 2213 performs control of each partition 211, as well as management (such as update) of the partition configuration information 2211 in accordance with an instruction through the management agent 2111, a direct instruction from the administrator by use of a local input device, or the like.

Further, the hardware 231 is hardware of the computer constituting the partitioning enabled open system 20, and comprises a main body hardware group 2311.

As shown in the figure, the main body hardware group 2311 includes hardware such as a processor 23112, a processor temperature sensor 23113, a processor fan 23114, a memory 23115, input/output devices 23116, a power supply 23117, a power supply fan 23118, a voltage sensor 23119, a chassis fan 23120, a chassis temperature sensor 23121, and the like.

The main body hardware group 2311 further comprises a hardware data collection unit 23111. The hardware data collection unit 23111 manages configuration information of each piece of hardware included in the main body hardware 2311, and monitors the conditions of each sensor device and each piece of hardware, to detect a hardware failure.

Further, the hardware 231 comprises a service processor 2313, if necessary. The service processor 2313 is an extended device that can cooperate with the hardware data collection unit 23111 to perform configuration management, failure monitoring and control of the main body hardware group 2311. And, the service processor 2313 comprises a processor, a power supply or storage battery, a storage, a communication I/F, a timer, input/output devices, and the like, differently from the main body hardware group 2311. By providing the service processor 2313, which is a device independent of the main body of the partitioning enabled open system 20, it becomes possible to perform processing such as notification of failure data when a fatal failure (for example, a stop of the main body or operating system) is generated in the main body of the partitioning enabled open system 20, or to perform power control of the main body of the partitioning enabled open system 20.

Next, details of the above-mentioned partition configuration information 2211 will be described.

FIG. 3 is a diagram showing an example of structure of the partition configuration information 2211.

As shown in the figure, the partition configuration information 2211 comprises: a processor number 221101, a processor mode 221102, and a sharing ratio 221103, as information on a processor; a memory slot number 221104, a total memory size 221105, a dedicated memory size 221106, a shared memory size 221107, and a shared partition name 221108, as information on a memory; and an input/output device allocation condition 221109 as information on input/output devices.

The processor number 221101 is information indicating a physical position of a processor allocated to each partition 211. The processor mode 221102 is information indicating if the processor is dedicated to one partition 211 or shared by a plurality of partitions 211. The sharing ratio 221103 is information indicating a ratio of processor throughput for interrupt processing or the like.

The memory slot number 221104 is information indicating a physical position of the memory allocated to each partition 211. The total memory size 221105 is information indicating a total capacity of the memory allocated to each partition 211. The dedicated memory size 221106 indicates a memory capacity dedicated to each partition 211 out of the total memory size 221105. The shared memory size 221107 indicates a capacity of the memory shared with other partitions 211 out of the total memory size 221105. The shared partition name 221108 is information indicating other partitions that share the memory.

The input/output device allocation condition 221109 is information indicating which partition 211 only one hardware device such as a keyboard, a mouse, a display, or the like, existing in the main body of the chassis is presently allocated to.

The partition configuration information 2211 further comprises computer identification information 221110. The computer identification information 221110 is identification information (for example, a serial number or the like of the computer) that uniquely indicates the computer itself. And, when the partitioning control unit 221 sends information to the management agent 2111, the computer identification information 221110 is always attached to the sent information. The computer identification information 221110 is used by the management console 10 to judge that the computer itself is a partitioning enabled system and each piece of hardware belongs to one computer, for example.

Although not shown in the figure, the partition configuration information 2211 further comprises information for each partition, which indicates if the partition concerned should be activated at the same time with switch-on of the power supply. Further, in the case that partitions 211 divide and share extended hardware such as a hard disk within the computer, similarly to the examples of the processor and memory, the partition configuration information 2211 keeps therein information indicating a relation between each piece of extended hardware and each partition.

Next, operation of the partitioning enabled open system 20 having the above-described configuration will be described.

First, initialization process at the time of activation of the system will be described.

Figure 4:
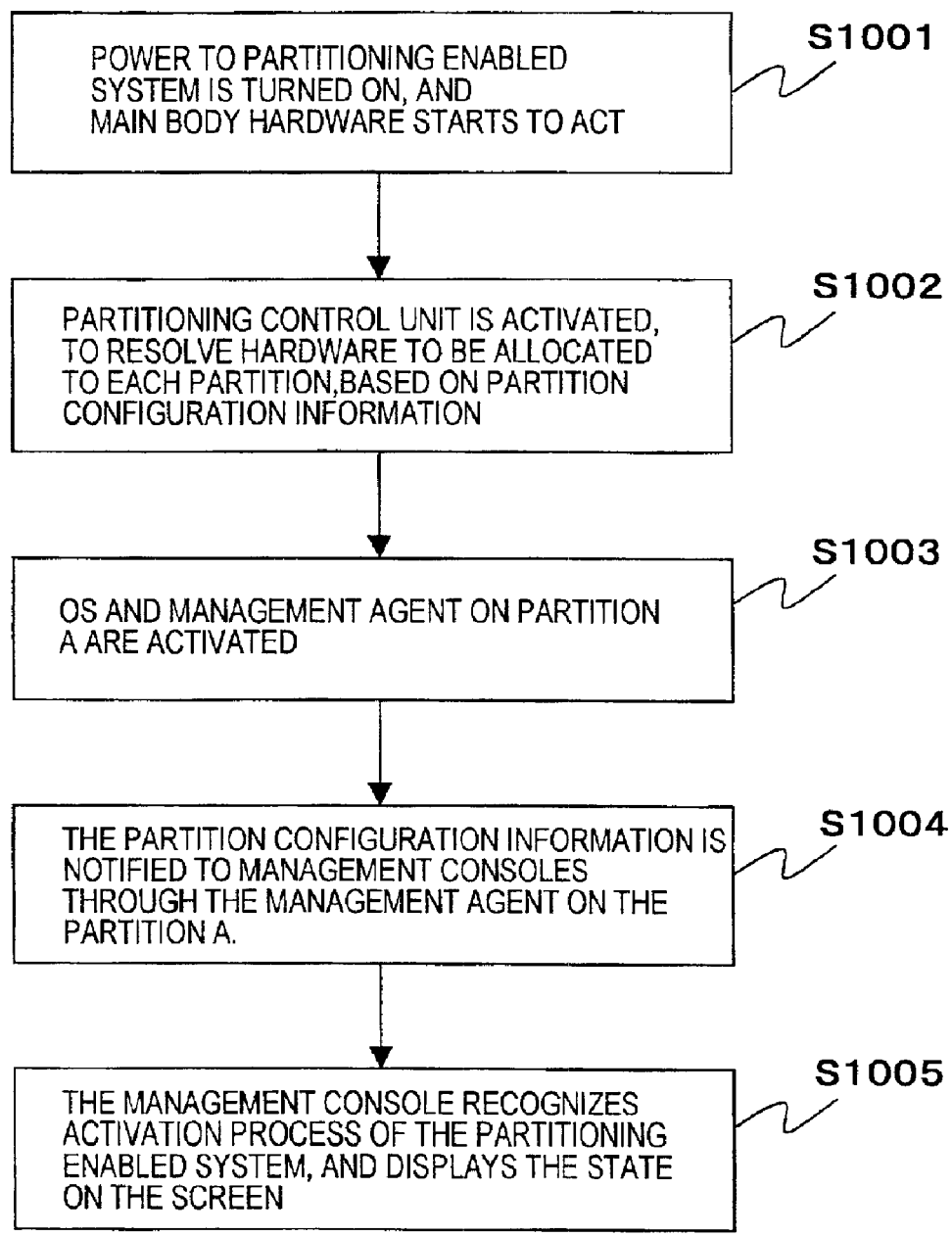
FIG. 4 is a diagram showing the flow of initialization process at the time of activation of the system.

FIG. 4 is a diagram showing the flow of initialization process at the time of system activation in the partitioning enabled open system 20. Here, will be described process in which one partition 211 (for example, the partition A) is activated at the time of system activation. When a plurality of partitions are to be activated at the time of system activation, those partitions are sequentially activated in the same manner.

When the power supply 23117 of the partitioning enabled open system 20 is switched on, for example, manually or under an instruction of the service processor 2313, each piece of the main body hardware group 2311 starts to be activated (S1001).

Next, the partitioning control unit 221 is activated to decide hardware to be allocated to each partition, based on the partition configuration information 2211 (S1002). The partition configuration information 2211 has been set in advance to suitable values corresponding to actual conditions, by the administrator through the management console 10 or a local input device. When the service processor 2313 exists, the service processor 2313 may perform similar process, in stead of the partitioning control unit 221.

Next, the OS 2110 of the partition A is activated, and further, the management agent 2111, which operates on the OS 2110, is activated (S1003).

Next, the partition configuration information 2211 is notified to the management console 10, through the communication relay unit 2212 in the partitioning control unit 221, and through the communication unit with partitioning control unit 21115 and the external communication unit 21111 in the management agent 2111 (S1004). At that time, also the computer identification information 221110 is notified to the management console 10.

On receiving the mentioned information, the management console 10 analyzes the information in question, and displays the fact that the managed computer is an partition enabled system, displays the number of the partitions constituting the managed computer, and displays if each partition 211 is presently in an activated state, on its screen (S1005).

Also, in the case that, after the activation of the computer, an additional partition is individually activated under an instruction from the administrator, the computer identification information 221110 etc. are notified to the management console 10. And, the management console 10 used the notified computer identification information 221110 to judge if another partition existing in the same computer is activated.

Next, operation of acquiring hardware configuration information in the partitioning enabled open system 20 will be described.

Figure 5:
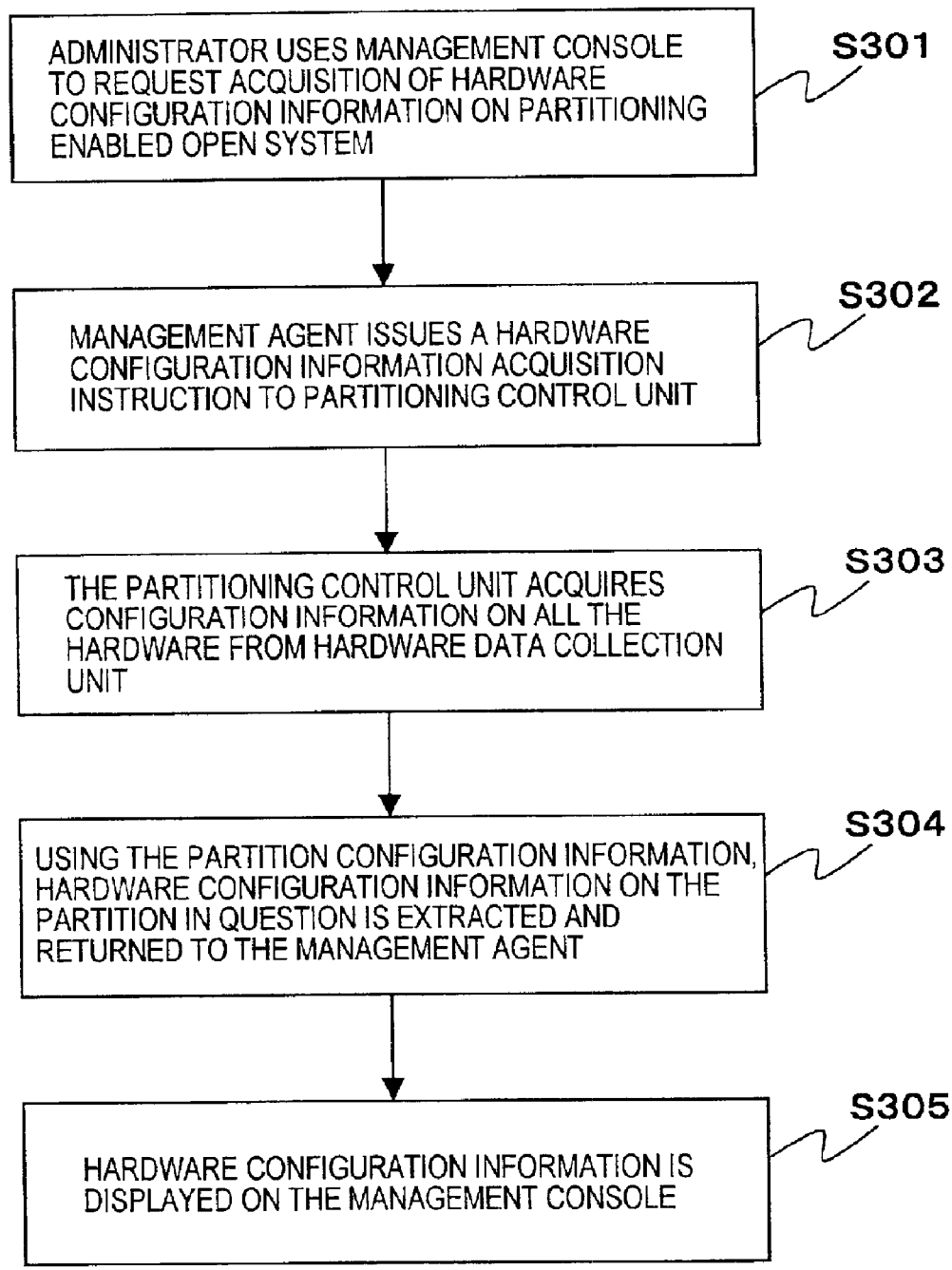
FIG. 5 is a diagram showing the flow of processing at the time of acquiring hardware configuration information.

FIG. 5 is a diagram sowing the flow of processing at the time of acquiring hardware configuration information in the partitioning enabled open system 20. Here, will be described the case of acquisition of hardware configuration information of one partition 211 (for example, the partition A) in the partitioning enabled open system 20.

First, through the management console 10, the administrator requests acquisition of hardware configuration information from the partition A of the partitioning enabled open system 20 (S301).

When the management agent 2111 on the partition A receives that request through the external communication unit 21111, the management agent 2111 issues a hardware configuration information acquisition instruction to the partitioning control unit 221 through the communication unit with partitioning control unit 21115 (S302).

The partition configuration management unit 2213 in the partitioning control unit 221 receives that instruction, and then, the partition configuration management unit 2213 acquires configuration information on all the hardware existing within the partitioning enabled open system 20, from the hardware data collection unit 23111 through the communication relay unit 2212 (S303).

Then, the hardware information allocated to the partition A is acquired from the partition configuration information 2211. And, using that information, only the hardware configuration information related to the partition A is extracted from the configuration information on all the hardware.

Then, the extracted hardware configuration information is notified to the management agent 2111 through the communication relay unit 2212 (S304).

The management agent 211 notifies the hardware configuration information received from the partitioning control unit 221 to the management console 10 through the external communication unit 21111, and the information is displayed on the management console 10 under observation of the administrator (S305).

Here, each piece of the hardware configuration information notified to the management agent 211 in the step S304 includes the computer identification information 221110, also. Based on the mentioned information, the management console 10 can know if the information from each partition 211 is information from a partition within the same computer.

Hereinabove, the description has been given to the case where configuration information on hardware allocated to one partition is acquired. In the case of a request for acquisition of the hardware configuration information 2211 of the whole computer, the partitioning control unit 221 returns the configuration information on all the hardware to the management agent 2111, without performing the extraction processing in the step S304.

Next, will be described processing at the time of occurrence of a hardware failure in the partitioning enabled open system 20.

Figure 6:
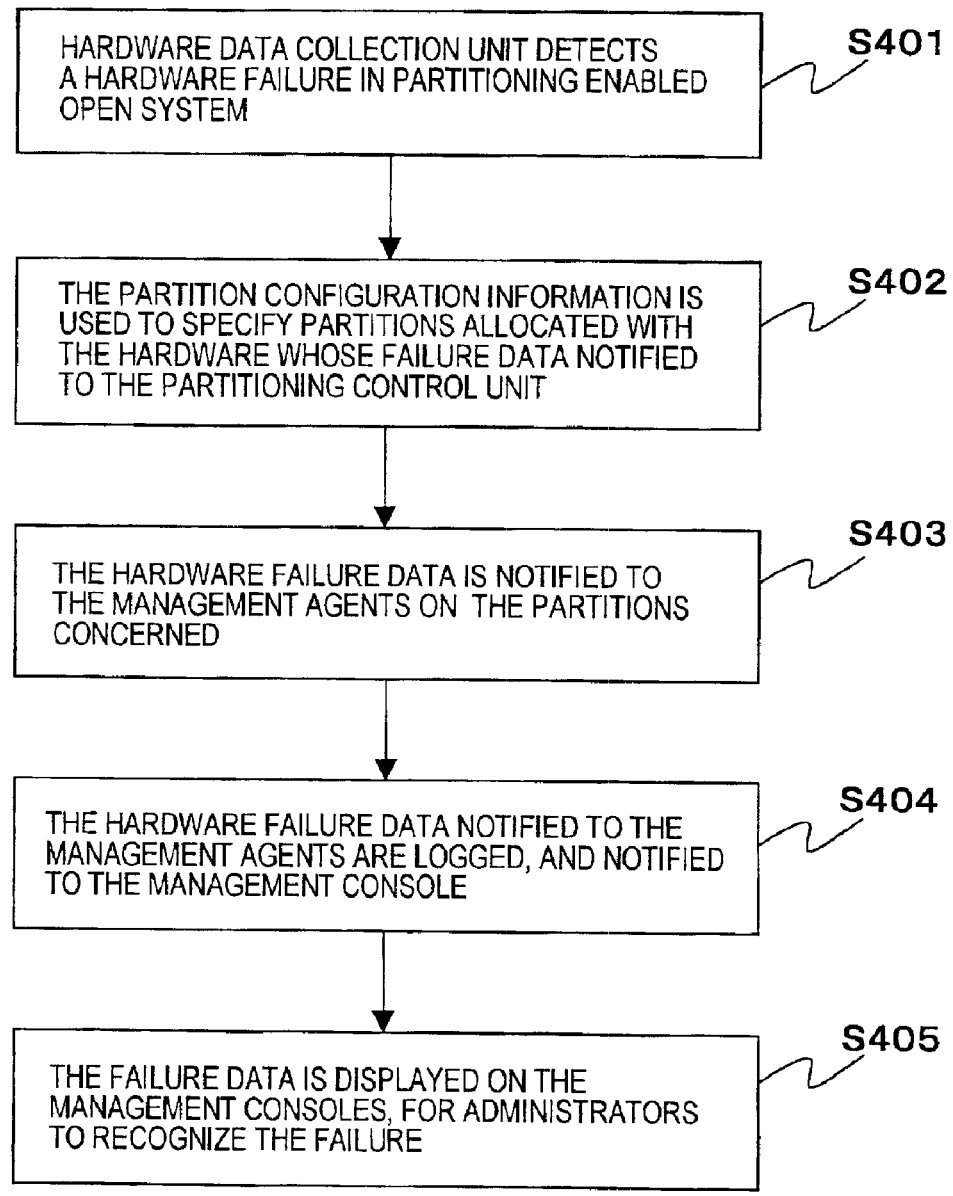
FIG. 6 is a diagram showing the flow of processing at the time of occurrence of a hardware failure.

FIG. 6 is a diagram showing the flow of processing at the time of occurrence of a hardware failure in the partitioning enabled open system 20. Here, will be described the case where a failure is generated in the hardware allocated to one partition 211 (for example, the partition A) in the partitioning enabled open system 20.

First, the hardware data collection unit 23111 monitors the conditions of the sensor devices and each hardware, and, on detecting occurrence of a failure, notifies the information on the detected hardware failure to the partitioning control unit 221 (S401).

Being notified of the hardware failure data, the partitioning control unit 221 refers to the partition configuration information 2211 in order to specify the partition 211 (for example, the partition A) to which the failure-detected hardware is allocated (S402). Then, the partitioning control unit 221 notifies the information on the detected hardware failure to the management agent 2111 of the specified partition A (S403).

The hardware failure data notified to the management agent 2111 is delivered to the failure data management unit 21112 through the communication unit with partitioning control unit 21115 to be recorded in the log file 21113, and at the same time, is notified to the management console 10 through the external communication unit 21111 (S404).

Receiving the above-mentioned information, the management console 10 displays the notified hardware failure on the screen or the like, to inform the administrator of the occurrence of the hardware failure (S405).

Here, when the hardware failure data is notified from the partition control unit 221, the management agent 2111 may perform various control operations on software in the partition 211 in addition to or instead of notifying the failure data in question to the management console 10 in the above step S404. For example, the failure data management unit 21112 may notify the failure data to the OS 2110 or an application operating on the OS 2110, stop the OS 2110 or an application operating on the OS 2110, or perform transfer processing that makes another OS or an application operating on another OS inherit processing under execution by the OS 2110 or an application operating on the OS 2110.

By performing such processing, it is possible to link with software control when a hardware failure is generated, and it is also possible to realize an autonomous countermeasure processing for a failure, in the sense that it is closed within one computer.

When a hardware failure detected by the hardware data collection unit 23111 is such a fatal failure as to stop the system on the computer, the above-described information transfer is impossible. However, even in such a case, if the computer has the service processor 2313, the failure data can be notified to the management console 10 through the service processor 2313. Further, in the case that a computer has the service processor 2313, even when a hardware failure detected by the hardware data collection unit 23111 is not fatal, the failure data concerned may be notified to the service processor 2312, to accumulate the failure data in a log management unit provided within the service processor 2313, and, at the same time, to notify the failure data to the management console 10 also from the service processor 2313.

Next, will be described processing at the time of occurrence of a software failure in the partitioning enabled open system 20.

Figure 7:
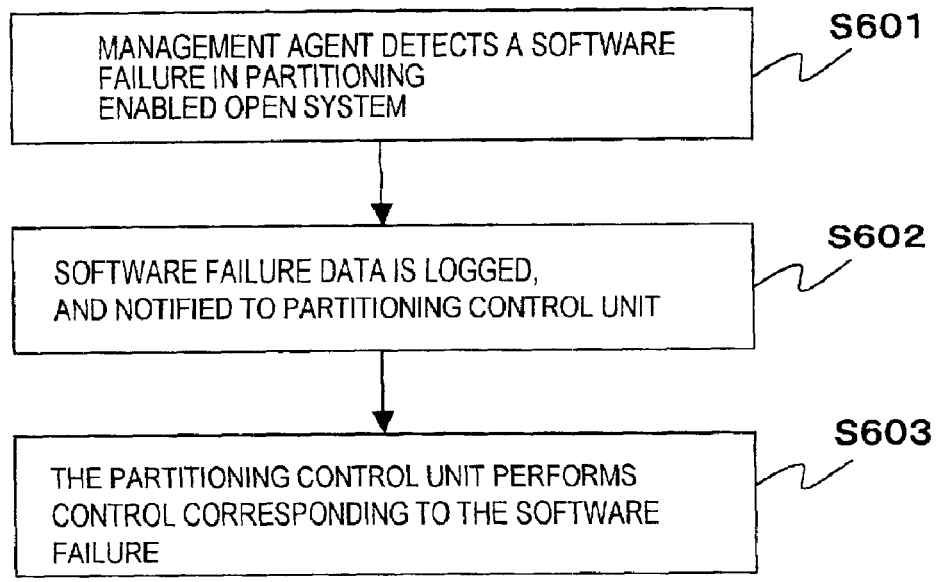
FIG. 7 is a diagram showing the flow of processing at the time of occurrence of a software failure.

FIG. 7 is a diagram showing the flow of processing at the time of occurrence of a software failure in the open-type partition enabled system 20. Here, will be described the case where a software failure is generated in one partition 211 (for example, the partition A) in the partitioning enabled open system 20.

First, when the software failure monitoring unit 21114 in the management agent 2111 detects occurrence of a software failure in the OS 2110 or an application operating on the OS 2110, the software failure monitoring unit 21114 notifies the information on the detected software failure to the failure data management unit 21112 (S601).

The failure data management unit 21112 records the notified software failure data to the log file 21113, and, at the same time, notifies it to the partitioning control unit 221 through the communication unit with partitioning control unit 21115 (S602). At that time, the software failure data may be notified also to the management console 10, through the external unit 21111.

In the partitioning control unit 221, when the partition configuration management unit 2213 receives the software failure data through the communication relay unit 2212, the partitioning control unit 221 performs various control operations on the partition 211 (for example, the partition A) where the software failure has occurred (S603). For example, termination processing and re-activation processing for the partition A may be performed, or hardware reallocation processing for the hardware allocated to the partition A may be performed. When hardware reallocation processing is performed, the partition configuration information 2211 is updated according to the contents of the reallocation.

By performing such processing, it is possible to link with hardware control when a software failure is generated, and it is also possible to realize an autonomous countermeasure processing for a failure, in the sense that it is closed within one computer.

Next, will be described processing of dynamic control of the hardware allocated to each partition 211 and processing of activation/termination of each partition 211, under an instruction from the management console 10, in the partitioning enabled open system 20.

Figure 8:
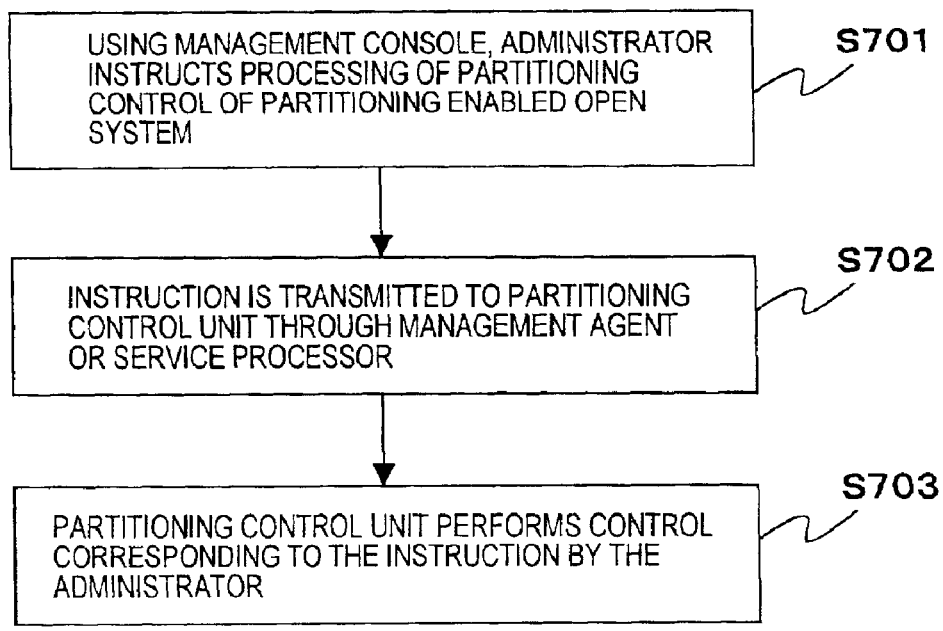
FIG. 8 is a diagram showing the flow of processing for performing control etc. of hardware under an instruction from a management console.

FIG. 8 is a diagram showing the flow of processing of dynamic control of the hardware allocated to each partition 211 or processing of activation/termination of each partition 211, under an instruction from the management console 10, in the partitioning enabled open system 20. Here, will be described the case where control instructions are given in relation to one partition 211 (for example, the partition A) in the partitioning enabled open system 20.

First, the administrator uses the management console 10 to issue a processing instruction directed to the partitioning control unit 221 for partitioning control of the partitioning enabled open system 20 (S701).

The issued instruction is transferred to the partitioning control unit 221 through the management agent 2111 or the service processor 2313 (S702).

In the partitioning control unit 221 that has received the instruction, the partition configuration management unit 2213 performs dynamic control of the hardware allocated to the partition A or activation/termination control of the partition A, according to the contents of the instruction (S703). Here, when hardware reallocation processing is performed, the partition configuration information 2211 is updated according to the contents of reallocation.

Here, it is possible that the partitioning control unit 221 performs dynamic control or the like of the hardware allocated to each partition 211, based on not only an instruction from the management console 10, but also hardware failure data notified from the hardware data collection unit 23111.

[Second Embodiment]

Next, another configuration of the partitioning enabled open system 20 will be described.

FIG. 9 is a diagram showing another configuration of the partitioning enabled open system 20. This figure shows also a configuration required for performing configuration management, failure monitoring, and control of hardware resources. As shown in the figure, the partitioning enabled open system 20a comprises a plurality of partitions 211 (A–N), a management-dedicated partition 240, a partitioning control unit 221, and hardware 231.

Differences from the configuration shown in FIG. 2 lie in that the management-dedicated partition 240 is provided, and that each partition 211 other than the management-dedicated partition 240 is provided with a software management agent 2113 instead of the management agent 2111.

The partitioning control unit 221 and the hardware 231 have the similar configurations as those shown in FIG. 2.

The management-dedicated partition 240 is one of a plurality of partitions provided in the partitioning enabled open system 20a, and is operated for management of the whole computer.

On the management-dedicated partition 240, a management OS 2410 that assures real time operation (hereinafter, referred to as RAS-OS) and an integrated management agent 2411 operate and communicate with the management console 10.

The RAS-OS 2410 is an OS that enables real time control, and is allocated with the minimum resources and always continues to operate as far as the partitioning enabled system operates.

The integrated management agent 2411 operating on RAS-OS 2410 cooperates with the software management agents 2113 operating respectively on the partitions 211, the partitioning control unit 221, and the hardware data collection unit 23111, to realize configuration management, failure monitoring and control of the whole computer.

As shown in FIG. 9, the integrated management agent 2411 comprises an external communication unit 21111, a failure data management unit 21112, a log file 21113 and a communication unit with partitioning control unit 21115. The external communication unit 21111, the failure data management unit 21112, the log file 21113 and the communication unit with partitioning control unit 21115 are respectively similar to the external communication unit 21111, the failure data management unit 21112, the log file 21113 and the communication unit with partitioning control unit 21115 provided to the management agent 2111 shown in FIG. 2.

Further, the software management agent 2113 comprises a software failure monitoring unit 21114 and a communication unit with partitioning control unit 21115. The software failure monitoring unit 21114 and the communication unit with partitioning control unit 21115 are respectively similar to the software monitoring unit 21114 and the communication unit with partitioning control unit 21115 provided to the management agent 2111 shown in FIG. 2.

The software management agent 2113 monitors a software failure of the OS 2110 or an application operating on the OS 2110, and communicates with the partitioning control unit 221 and does not directly communicate with the management console 10.

In the partitioning enabled open system 20a shown in FIG. 9, the integrated management agent 2411 utilizes the partitioning control unit 221 and the hardware data collection unit 23111 to perform configuration management, failure monitoring and control of the hardware of all the partitions, which includes all the hardware existing in the computer.

In other words, the integrated management agent 2411 takes all the tasks assumed by the respective management agents 2111 on the partitions 211 in the partitioning enabled open system 20 shown in FIG. 2.

For example, hardware failure data detected by the hardware data collection unit 23111 is notified to the integrated management agent 2411 through the partitioning control unit 221. Receiving that notification, the integrated management agent 2411 notifies the received failure data to the management console 10, or performs control of the software, in cooperation with the software management agents 2113.

Further, information on a software failure occurred in each partition 211 is notified by the software management agent 2113 on the partition 211 in question to the integrated management agent 2411 through the partitioning control unit 221.

In the present embodiment, the processing flows of the configuration management, failure monitoring and control of the hardware using the integrated management agent 2411 are basically similar to the above-described processing flows shown in FIGS. 4–8.

As described in detail above, the present invention can realize configuration management, failure monitoring and control of hardware in an open-type computing system in which a plurality of OSs run.

What is claimed is:

1. A computing system in which a plurality of OSs run on hardware of one computer, said computing system comprising:

management agents that are respectively executed on the OSs, to manage said OSs;

a partitioning control unit that holds partition configuration information indicating a relation between each OS and the hardware, and controls allocation of the hardware to each OS; and a hardware data collection unit that collects data on said hardware; wherein:

said computing system uses said partition configuration information to perform hardware management for each OS;

said computing system further comprising management consoles for performing data collection, failure data reception, and control of said computer on which a plurality of OSs run, wherein, when said hardware data collection unit detects an occurrence of a failure in a piece of the hardware, the hardware data collection unit notifies the failure data to said partitioning control unit;

said partitioning control unit notifies said failure data to management agents corresponding to OSs allocated with said piece of the hardware in Which the failure has occurred; and said management agents notified of said failure data, in turn, notify said failure data to said management consoles.

2. The computing system according to claim 1, wherein:

when one of said management agents receives a request from one of said management consoles for acquisition of hardware configuration information, the management agent notifies said request to said partitioning control unit;

the partitioning control unit, which has been notified of said request, acquires the data on said hardware from said hardware data collection unit, and extracts requested information on hardware using said partition configuration information, to send said information extracted to said management agent; and said management agent notifies the information received from said partitioning control unit to said management console.

3. The computing system according to claim 1, wherein:

when said hardware data collection unit detects an occurrence of a failure in a piece of the hardware, the hardware data collection unit notifies the failure data to said partitioning control unit;

said partitioning control unit notifies said failure data to management agents corresponding to OSs allocated with said piece of the hardware in which the failure has occurred; and said management agents which are notified of said failure data, control software currently performed on the OSs allocated with said piece of the hardware in which the failure has occurred, based on the failure data notified.

4. The computing system according to claim 1, wherein:

when one of said management agents detects an occurrence of a failure in software, said management agent notifies the failure data to said partitioning control unit;

said partitioning control unit performs control of reallocation of the hardware allocated to each OS, and/or performs activation control for each OS, based on said failure data.

5. A computing system in which a plurality of OSs run on hardware of one computer, said computing system comprising:

an integrated management agent that is executed on a primary OS to manage said computer;

software management agents that are respectively executed on the OSs except for said primary OS, to manage software executed on respective OSs concerned;

a partitioning control unit that holds partition configuration information indicating a relation between each OS and the hardware, and controls allocation of the hardware to each OS; and a hardware data collection unit that collects data on said hardware;

wherein:

said computing system uses said partition configuration information to perform hardware management for each OS, wherein:

when said hardware data collection unit detects an occurrence of a failure in the hardware, the hardware data collection unit notifies the failure data to said partitioning control unit;

said partitioning control unit notifies said failure data to said integrated management agent; and said integrated management agent controls software through said software management agents, based on the failure data notified.

6. The computing system according to claim 5, further comprising: management consoles for performing data collection, failure data reception, and control of said computer on which a plurality of OSs run.

7. The computing system according to claim 6, wherein:

when said integrated management agent receives a request from one of said management consoles for acquisition of hardware configuration information, said integrated management agent notifies said request to said partitioning control unit;

the partitioning control unit, which has been notified of said request, acquires the data on said hardware from said hardware data collection unit, and extracts requested information on hardware using said partition configuration information, to send said information extracted to said integrated management agent; and said integrated management agent notifies the information received from said partitioning control unit to said management console.

8. The computing system according to claim 5, wherein:

when one of said software management agents detects an occurrence of a failure in software, said software management agent notifies the failure data to said partitioning control unit;

said partitioning control unit performs control of reallocation of the hardware allocated to each OS, and/or performs activation control for each OS, based on said failure data.

9. The computing system in which a plurality of program execution segment run on hardware of one computer, said computing system comprising:

management agents that are respectively executed on the program execution segment, to manage said program execution segment;

a partitioning control unit that holds partition configuration information indicating a relation between each program execution segment and the hardware, and controls allocation of the hardware to each program execution segment and a hardware data collection unit that collects data on said hardware;

wherein:

said computing system uses said partition configuration information to perform hardware management for each program execution segment, wherein:

when said hardware data collection unit detects an occurrence of a failure in a piece of the hardware, the hardware data collection unit notifies the failure data to said partitioning control unit;

said partitioning control unit notifies said failure data to management agents corresponding to program execution segment allocated with said piece of the hardware in which the failure has occurred; and said management agents which are notified of said failure data, control software currently performed on the program execution segment allocated with said piece of the hardware in which the failure has occurred, based on the failure data notified.

10. The computing system in which a plurality of program execution segment run on hardware of one computer, said computing system comprising:

management agents that are respectively executed an the program execution segment, to manage said program execution segment;

a partitioning control unit that holds partition configuration information indicating a relation between each program execution segment and the hardware, and controls allocation of the hardware to each program execution segment and a hardware data collection unit that collects data on said hardware;

wherein:

said computing system uses said partition configuration information to perform hardware management for each program execution segment, wherein:

when one of said management agents detects an occurrence of a failure in software, said management agent notifies the failure data to said partitioning control unit;

said partitioning control unit performs control of reallocation of the hardware allocated to each program execution segment, and/or performs activation control for each program execution segment, based on said failure data.

* * * * *